United States Patent [19]
Villa

[11] Patent Number: 5,228,094
[45] Date of Patent: Jul. 13, 1993

[54] PROCESS OF IDENTIFYING AND AUTHENTICATING DATA CHARACTERIZING AN INDIVIDUAL

[75] Inventor: Pierre Villa, Fresnes, France

[73] Assignee: France Telecom Etablissement autonome de droit public (Centre National d'Etudes des Telecommunications, Issy Les Moulineaux, France

[21] Appl. No.: 814,605

[22] Filed: Dec. 30, 1991

[30] Foreign Application Priority Data

Dec. 28, 1990 [FR] France .................... 90 16447

[51] Int. Cl.$^5$ .............................. G06K 9/00
[52] U.S. Cl. ........................ 382/4; 235/380; 340/825.34; 382/2
[58] Field of Search ............... 382/2, 3, 4, 5; 340/825.3, 825.01, 825.34; 356/71; 235/380, 382, 382.5

[56] References Cited

U.S. PATENT DOCUMENTS

| | | | |
|---|---|---|---|
| 4,151,512 | 4/1979 | Riganati et al. | 382/4 |
| 4,210,899 | 7/1980 | Swonger et al. | 382/4 |
| 4,630,308 | 12/1986 | Hongo | 382/4 |
| 4,783,823 | 11/1988 | Tasaki et al. | 382/2 |
| 4,900,902 | 2/1990 | Sakakibara | 382/2 |
| 4,995,086 | 2/1991 | Lilley et al. | 382/2 |
| 5,054,088 | 10/1991 | Gunderson et al. | 382/3 |

FOREIGN PATENT DOCUMENTS

| | | |
|---|---|---|
| 2578340 | 9/1986 | France . |
| WO82/03286 | 9/1982 | PCT Int'l Appl. . |
| WO89/00741 | 1/1989 | PCT Int'l Appl. . |
| WO89/03099 | 4/1989 | PCT Int'l Appl. . |

*Primary Examiner*—Joseph Mancuso
*Attorney, Agent, or Firm*—Oblon, Spivak, McClelland, Maier & Neustadt

[57] ABSTRACT

The invention relates to a process of identifying and authenticating data characterizing an individual, by verifying this data use a biometer. The process consists of recording on a memory card the data characterizing the individual owner of the card and of acquiring independently, by a biometer, the data characterizing this individual so as to obtain his imprint to compare it to that of the card and of proceeding to an identical processing of the imprint in the card and in the biometer, so as to establish a parity word and to exchange the parity words obtained by the card and by the biometer to compare them.

4 Claims, 5 Drawing Sheets

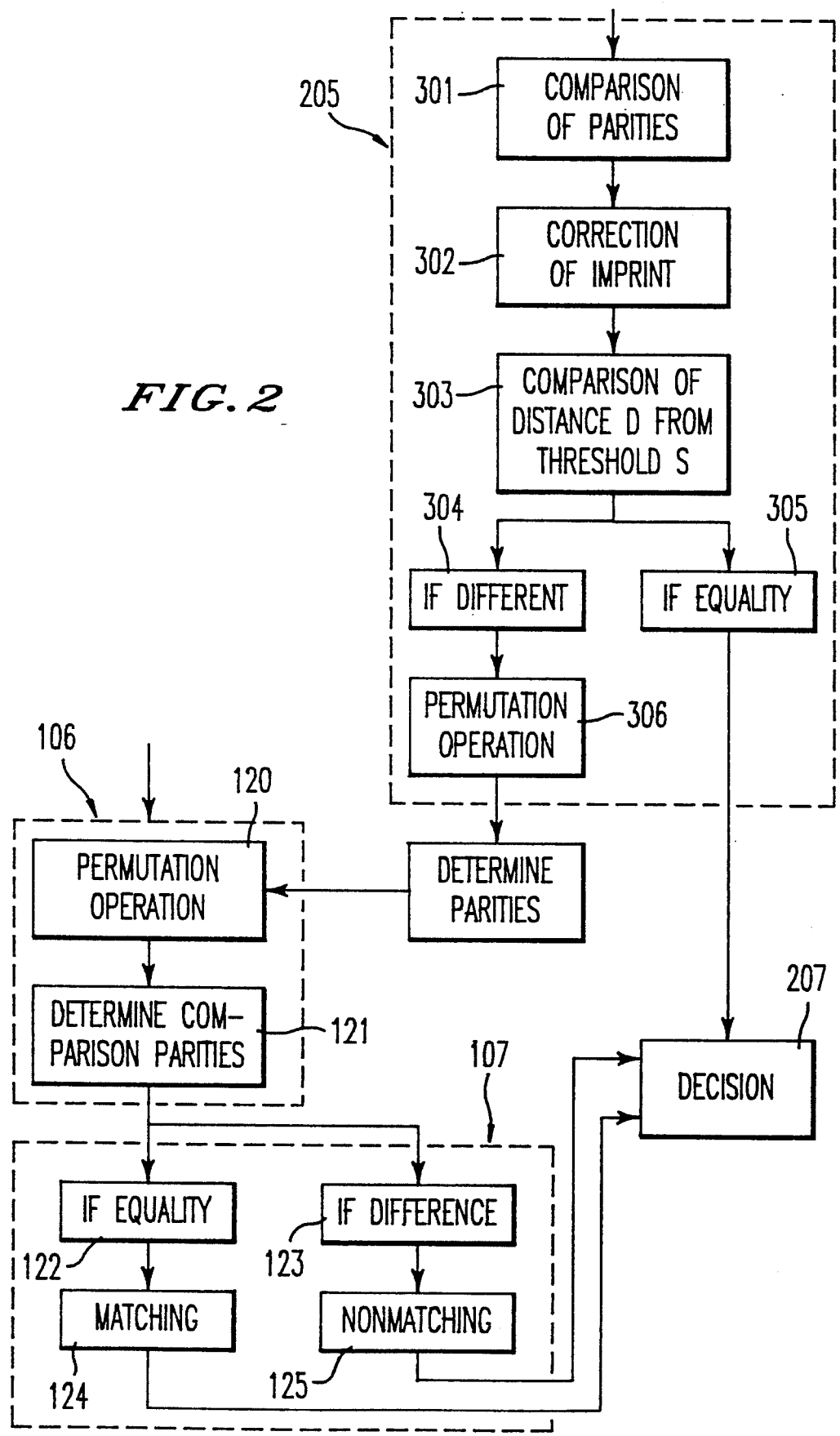

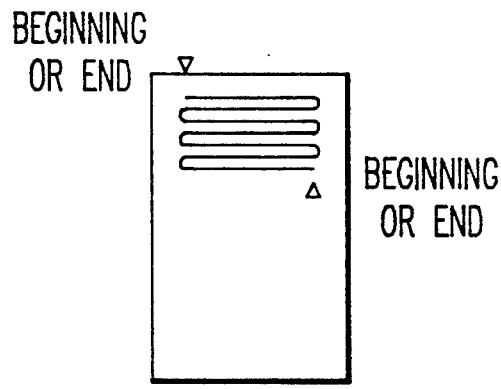
FIG. 3a
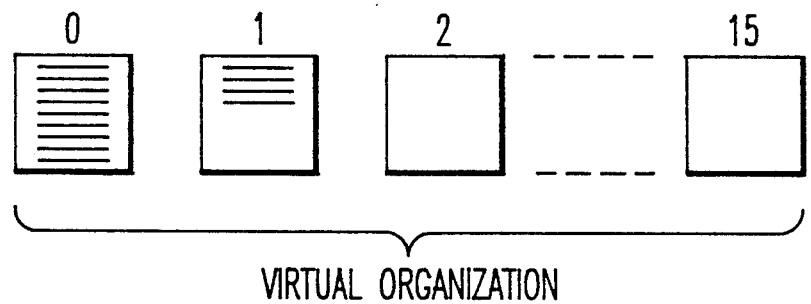
FIG. 3b
| 0 | 1 | 2 | 3 |
|---|---|---|---|
| 4 | 5 | 6 | 7 |
| 8 | 9 | 10 | 11 |
| 12 | 13 | 14 | 15 |
FIG. 3c

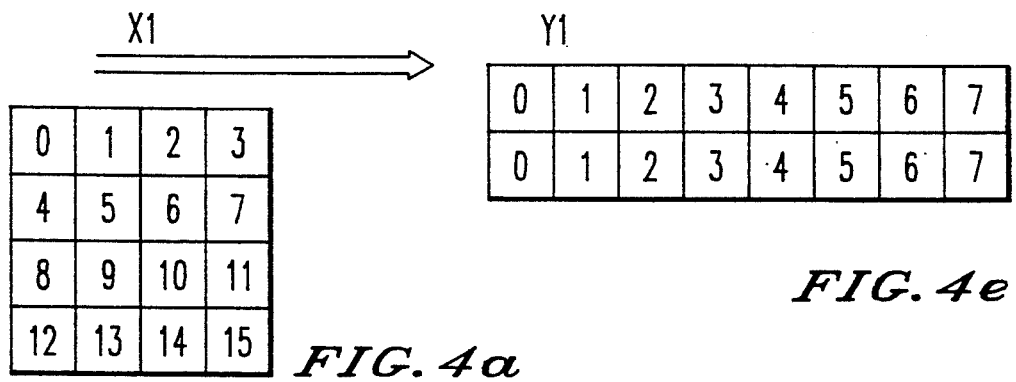
FIG. 4a  FIG. 4e
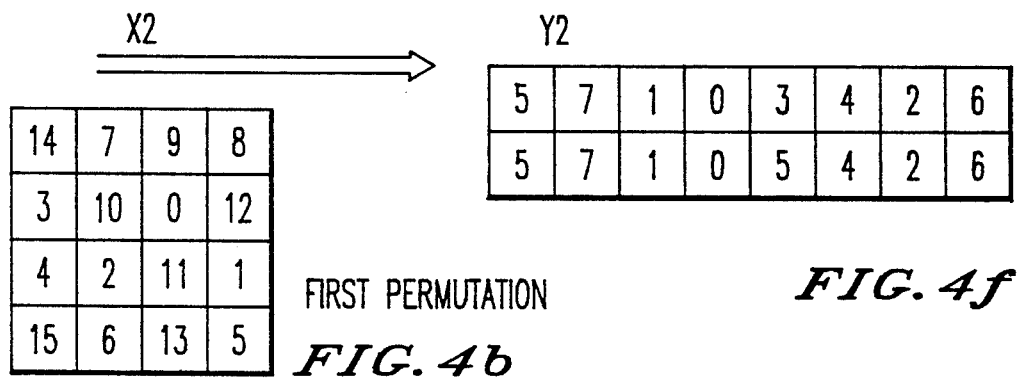
FIRST PERMUTATION FIG. 4b  FIG. 4f
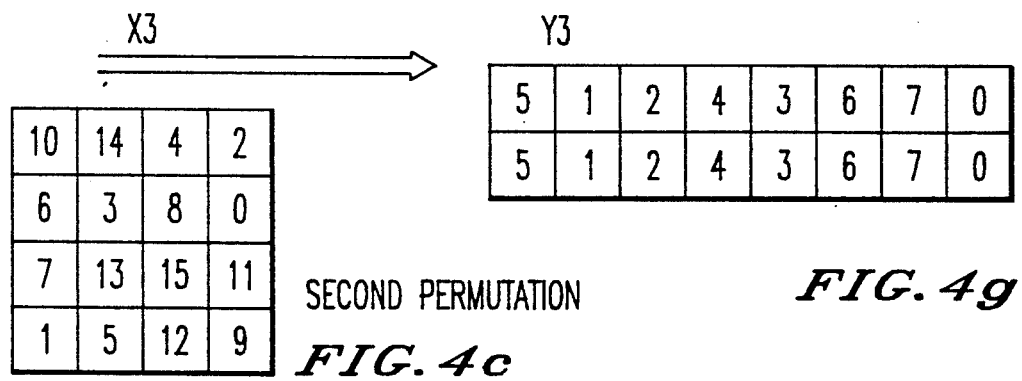
SECOND PERMUTATION FIG. 4c  FIG. 4g
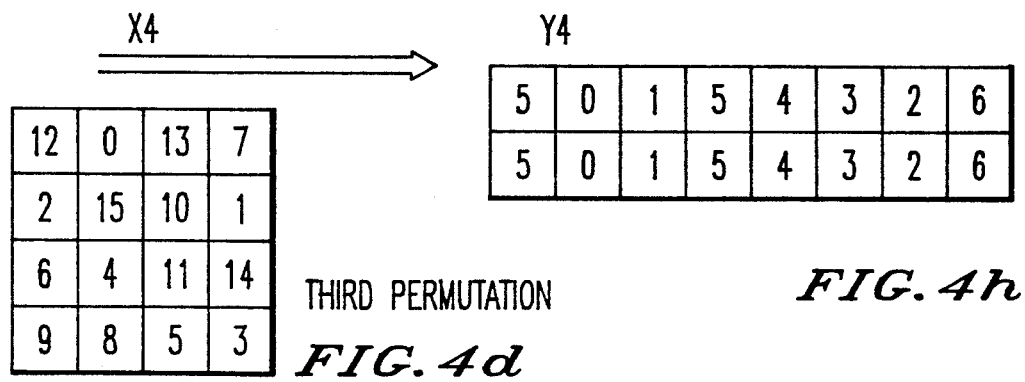
THIRD PERMUTATION FIG. 4d  FIG. 4h

FIG. 5a

TABLE A

FIRST 2 PERMUTATIONS --- X1    X2

| X1 | | X2 |
|---|---|---|
| 0 | GOES INTO | 6 |
| 1 | | 11 |
| 2 | | 9 |
| 3 | | 4 |
| 4 | | 8 |
| 5 | | 15 |
| 6 | | 13 |
| 7 | | 1 |
| 8 | | 3 |
| 9 | | 2 |
| 10 | | 5 |
| 11 | | 10 |
| 12 | | 7 |
| 13 | | 14 |
| 14 | | 0 |
| 15 | | 12 |

3rd PERMUTATION --- X3    X4

| X3 | | X4 |
|---|---|---|
| 0 | GOES INTO | 6 |
| 1 | | 11 |

FIG. 5b

TABLE B

| X2 | | X3 |
|---|---|---|
| 0 | GOES INTO | 1 |
| 1 | | 8 |
| 2 | | 15 |
| 3 | | 6 |
| 4 | | 5 |
| 5 | | 0 |
| 6 | | 7 |
| 7 | | 14 |
| 8 | | 2 |
| 9 | | 3 |
| 10 | | 11 |
| 11 | | 12 |
| 12 | | 10 |
| 13 | | 4 |
| 14 | | 9 |
| 15 | | 13 |

FIG. 5c

TABLE "a"

FIRST 2 PERMUTATIONS --- Y1    Y2

| Y1 | | Y2 |
|---|---|---|
| 0 | GOES INTO | 3 |
| 1 | | 2 |
| 2 | | 6 |
| 3 | | 4 |
| 4 | | 5 |
| 5 | | 0 |
| 6 | | 7 |
| 7 | | 1 |

3rd PERMUTATION --- Y3    Y4

FIG. 5d

TABLE "b"

| Y2 | | Y3 |
|---|---|---|
| 0 | GOES INTO | 0 |
| 1 | | 6 |
| 2 | | 1 |
| 3 | | 7 |
| 4 | | 5 |
| 5 | | 4 |
| 6 | | 2 |
| 7 | | 3 |

PROCESS OF IDENTIFYING AND AUTHENTICATING DATA CHARACTERIZING AN INDIVIDUAL

BACKGROUND OF THE INVENTION

1. Field of the Invention

The invention relates to a process of identifying and authenticating data characterizing an individual by verifying this data by a biometer.

2. Discussion of Background

A biometer is an apparatus able to perform the acquisition and processing of data relative to an individual. The data acquired is currently called a profile; during an authenticating verification an identifying piece of information such as the name of the individual is associated with it.

Among the acquired profiles there are the fingerprint, the imprint of the back of the eye, or a motion that is not easily imitated such as a signature, the striking on a keyboard or the vibrations of the vocal cords.

The processing of this type of data consists in digitizing and in reducing the volume of the digitized data by standard compression techniques. Generally, to do this, the biometer comprises a processing and control means called SAM (secure access module).

During a biometric verification, an individual can submit to a profile acquisition and provide his identity. He can also simply be required to provide only his identity.

A problem is encountered because it is possible for there to be a falsification either in the identifying data, or in the previously recorded profile. Therefore, it is not possible to assure a perfect correlation between identification and authentication.

In other words, an imprint can always be recognized as belonging to an individual present during the acquisition but the latter can deceive the verifier by passing himself off as another if he wishes to lie. It is sufficient to attach a false identification to a true authentication by falsifying, for example, the identification during his communication with the biometer or vice versa.

SUMMARY OF THE INVENTION

This invention makes it possible to eliminate these drawbacks. The invention, as characterized in the claims, solves the problem of the lack of correlation between the identification and the authentication of the characteristic data relative to an individual by linking this data by a recording on the same support and by verifying this data without exchange of the plain-language or encrypted profile.

This invention more particularly has as its object a process of identifying and authenticating data characterizing an individual, by verifying this data by a biometer characterized in that it consists:

a) in recording on a memory card the data characterizing the individual owner of the card, data composed of the identification and the profile of the individual in the form of an imprint consisting of a sequential string of binary words obtained by a biometer;

b) in acquiring independently, by a biometer, the data characterizing this individual so as to obtain his imprint to compare it with that of the card;

c) in proceeding to an identical processing of the imprint in the card and in the biometer, so as to establish a parity word and to exchange the parity words obtained by the card and by the biometer to compare them.

According to another characteristic of the invention, the processing phase consists in:

organizing in a virtual manner sequential groups of words into p matrix sub-blocks of P bits;

organizing in a virtual manner the matrix sub-blocks into a single matrix block of M rows, N columns;

performing permutations of the sub-blocks in matrix block $M \times N$;

performing permutations of the words inside the matrix sub-blocks;

determining a parity word for each row of matrix block $M \times N$;

exchanging the parities obtained in the card and in the biometer;

comparing these parities;

processing the imprint as a function of the result of the comparisons;

providing a decision on the identification and authentication as a function of the result of the processing.

According to another characteristic of the invention, performing the permutations of the sub-blocks consists in:

generating in the card a first series of random numbers and transmitting it to the biometer;

generating in the biometer a second series of random numbers and transmitting it to the card;

constituting a first table containing the X1 address of each sub-block in the matrix block and the corresponding X2 address provided by the first series of random numbers;

constituting a second table containing the X2 address obtained after the first permutation and the X3 address provided by the second series of random numbers.

According to another characteristic of the invention, the stage of comparing the parities consists in:

calculating the distance between the parities obtained by the card and those obtained by the biometer;

interrupting the verification in the case where the distance is approximately equal to a given distance;

performing a third permutation of the sub-blocks and of the words in the sub-blocks;

determining a parity word for each row of the matrix block;

exchanging the parities thus obtained in the card and in the biometer.

According to another characteristic of the invention, the correction stage performed by the biometer consists in assigning a word to each word row of the sub-blocks intended to indicate whether the bits forming each word are probably right or probably wrong or definitely right.

BRIEF DESCRIPTION OF THE DRAWINGS

Other characteristics and advantages of the invention will come out on reading the description made in an illustrative and absolutely nonlimiting way with regard to the drawings in which:

FIG. 2 represents the detail of certain stages of the process according to FIG. 1;

FIGS. 3a, 3b, 3c represent graphs illustrating the practical and virtual organization of the imprint;

FIGS. 4a to 4d graphs illustrating the permutations of the sub-blocks;

FIGS. 4e to 4h graphs illustrating the permutations inside the sub-blocks;

FIGS. 5a and 5b tables A and B;

FIGS. 5c and 5d tables a and b.

DETAILED DESCRIPTION OF THE PREFERRED EMBODIMENTS

Figure 1:
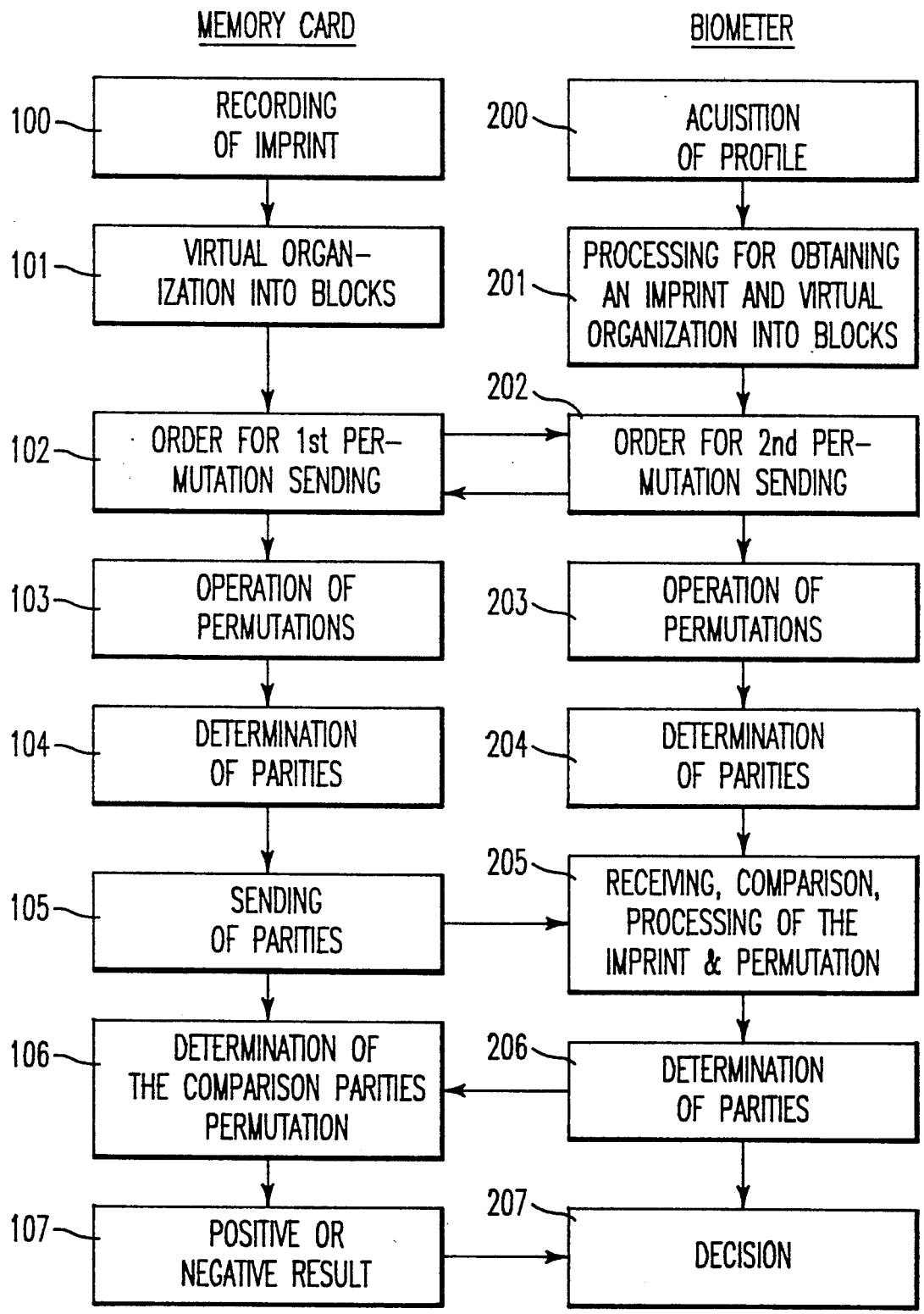
FIG. 1 represents the various stages of the process according to the invention in the form of a flowchart.

Referring now to the drawings, wherein like reference numerals designate identical or corresponding parts throughout the several views, and more particularly to FIG. 1 which represents the main stages of the process according to the invention in the form of a flowchart.

An individual for which biometric verifications are necessary is the owner of a card of the memory card type called CAM. The memory card possesses, in a standard way, control and storage processing means which will not be detailed more because they are part of the prior art.

The CAM, which is given to its owner, comprises a recording of the profile and identification of this owner.

The recorded profile has undergone a standard preprocessing which consisted in performing a compression of the digital data.

During a biometric verification, an acquisition of the profile of the owner of the card is again performed. This acquisition is independent of the first both in time and in space. The biometer which performs this second acquisition is not necessarily the same as the one which was used for the first. This profile also undergoes a preprocessing consisting in compressing the digital data.

The process according to the invention then consists in performing processing stages which will be developed below and which are for the most part identical.

The stages that carry references 100 to 107 are used in the card. The stages that carry references 200 to 207 are used in the processing means that the biometer comprises and which have an architecture similar to that of the card.

The horizontal arrows between the processing blocks of the card and biometer mean that there is an exchange of data between the card and the biometer. As will be detailed below, the data exchanged is in no case the data corresponding to the profile.

Stages 100-200

The data recorded in the card and in the biometer is recorded in the form of a sequential string of binary words.

Stages 101-201

This data is organized in a virtual manner in blocks as can be seen from the graphs shown in FIGS. 3a, 3b, 3c.

The organization remains virtual, in the sense that a profile other than the original one is not materially constituted in order to store it and then examine it. The parities which will be spoken of below are determined as the displacements of the sub-blocks and the internal permutations of the latter proceed.

A first virtual organization, FIG. 3b, consists in dividing the sequential string of binary words represented in FIG. 3a, into sub-blocks.

A second virtual organization, FIG. 3c, consists in combining the p sub-blocks into a single matrix block so as to have a matrix of size $M \times N = p$. By way of example, the sub-blocks are numbered from 0 to 15 and comprise 64 bits. The last blocks and the incomplete block are optionally completed by zeroes.

Matrix $M \times N$, according to this example, comprises sixteen sub-blocks and constitutes a block of 1024 bits.

Stages 102, 103-202, 203

The process then consists in performing permutations in the manner which will be described and with reference to the graphs represented in FIGS. 4a to 4h.

The sixteen sub-blocks are ordered in matrix $M \times N$ as shown in FIG. 4a, i.e., in the sequential order of sub-blocks 0 to 15.

The virtual positions of the sub-blocks in the matrix are called X1 addresses.

A first permutation of the sub-blocks in the matrix will make it possible to obtain new positions called X2 addresses.

A second permutation of the sub-blocks in this organization will make it possible to obtain new positions called X3 addresses. The passage from an X1 address to an X2 address is given by a table A, FIG. 5a. The passage from an X2 address to an X3 address is given by a table B, FIG. 5b.

Stages 102, 103-202, 203 further consist in performing permutations inside the sub-blocks.

By way of example, each row of a sub-block comprises 8 bits numbered 0 to 7.

In each sub-block the bits are already ordered according to the sequential order of entry. The virtual positions in the sub-block are called Y1 addresses (FIG. 4e).

After a first permutation, the bits are in a different order corresponding to the Y2 addresses (FIG. 4f).

After a second permutation, the bits are again in a different order corresponding to the Y3 addresses (FIG. 4g).

The passage from a Y1 address to a Y2 address is given by table a (FIG. 5c).

The passage from a Y2 address to a Y3 address is given by table b (FIG. 5d).

The various permutations are performed from random numbers that define the order in which the sub-blocks will be found, i.e., the X2 addresses, then X3.

The values which are given in tables A, B, a and b as well as the randoms are given by way of example.

For table A with 16 entries:

randoms: 0110 . 1011 . 1001 . 0100 . 0110 . 1000 . 1 .
. .

which corresponds to X2 addresses:

6 - 11 - 9 - 4 - 6* - 8

6* = this value has already been given, it is abandoned—the following value is taken.

For table B with 16 entries, the randoms obtained are taken to constitute table A but shifted by two bits, or:

randoms: . . . 1010 . 1110 . 0101 . 0001 . 1010 . 0 . . .

which corresponds for X3:

10 - 14 - 5 - 1 - 10 . . .

For table a with 8 entries, the same randoms are taken by taking packets of 3 bits, or:

011 . 010 . 111 . 001 . 010 . 001 . . .

which corresponds for Y2 to:

3 - 2 - 7 - 1 - 2* - 1* - 5 - ...

For table b with 8 entries, the randoms are shifted by two bits, or:

101 . 011 . 100 . 101 ...

which corresponds for Y3 to:

5 - 3 - 4 - 5 ...

Stages 104-204

These stages consist in determining parity words after each permutation.

A parity word is formed from the last bit of each row of the matrix. According to the example described, the parity word thus formed comprises thirty-two words of four bits located in a virtual manner after sub-blocks 3, 7, 11, 15.

Stages 105-205

These stages consist in exchanging the parity bits between the card and the biometer. In practice, there is no bidirectional exchange. The biometer receives the parity bits obtained by the card and performs a processing consisting in comparing the parity bits obtained on both sides and then in appreciably modifying the imprint that it has acquired to take into account slight changes that the profile has been able to undergo over time.

The modifying processes are detailed below.

Depending on the result of this processing, a third permutation is then performed. This permutation is performed as are the first and second i.e., by a double permutation. One permutation is performed for the sub-blocks constituting the matrix and one permutation occurs inside the sub-blocks.

The block shown in FIG. 4d is the result of the third permutation.

The X3 addresses of the sub-blocks are transformed into X4 addresses at the end of the third permutation (FIG. 4d). In the same way the Y3 addresses of the bits inside the sub-blocks (FIG. 4g) are transformed into Y4 addresses at the end of the fourth permutation (FIG. 4h).

Following these permutations, a new parity word is determined in the card and by the biometer. This word, according to the example given, consists of a set of thirty-two words of four bits located in a virtual manner after each of sub-blocks 7, 1, 14, 3.

The parities obtained in the biometer are sent to the card which compares them to those that it has obtained.

Stages 107-207

Following the comparison, the card sends a message interpreting whether there is conformity or nonconformity. The biometer can then make a decision on the identification and authenticity of the acquired profile.

Stages 106 and 205 have been detailed in FIG. 2.

Stage 205 consists in performing a comparison of the parities, stage 301, obtained at the end of the second permutation. In the case of an equality between the parities, a decision on the identification and authentication is made.

In the case where there is no identity, a correction of the imprint (stage 302) is performed. A comparison between the imprint acquired and the imprint corrected by a measurement of distance D that is compared to a predetermined threshold S (stage 303) is then performed.

If measured distance D is different from the threshold (stage 304) or if the biometer desires a certification of matching by the card, then a third permutation (306) is performed.

In the case where there is equality between distance D and threshold S, then the biometer makes a decision which can be ordering a third permutation.

After having performed the third permutation, a parity word is determined (stage 206) as has been previously described. Stage 106 consists in performing the third permutation (stage 120), then in determining parity word S to compare it with the parities determined by the biometer (stage 121).

Stage 107 consists, as has already been described, in declaring that there is matching (stage 124) or nonmatching (stage 125) between identification and authentication.

Stage 302 consists in performing a modification of the imprint so as to correct the possible changes that the profile has been able to make by restricting distance d between the two profiles.

To do this, the words that make up each row in a sub-block are associated with a three-bit word which is used to store the data which consists in stating:

bit 1: the eight bits of the thirty-two of the row are probably right.

bit 2: the eight bits are probably wrong.

bit 3: the eight bits are considered as definitely right.

During the permutation of the sub-blocks performed in the biometer, these three bits will remain attached to the eight bits of each row of sub-blocks.

The biometer compares the parity data of four bits for each row of thirty-two bits in the sub-blocks.

The absence of difference can correspond to the absence of error on the thirty-two bits or to a number of errors as the parities are compensated for.

When two parity bits out of the four are different, the biometer considers, possibly wrongly, that a single bit of the row of thirty-two is erroneous and that the error is in one of the sub-blocks of 8 bits of the row.

Short of being able to correct one of the bits of one of the rows of eight, the biometer enters or confirms the entry of bit 2 (probably wrong) in each row of sub-blocks.

The process makes it possible to exclude the following cases in the biometer:

bit 3 of the row of the sub-block is already used (right).

bit 1 (probably right) is already used, the biometer then deletes this entry.

The biometer proceeds in the same way according to the process when one, three or four parity bits are erroneous.

The processing which has just been described aims at correcting the acquired profile to seek to render it identical to the one held by the card.

This is possible only if at least one row of the block is identical on both sides at each permutation and if the number of erroneous bits in a row of thirty-two is frequently less than two.

When these conditions occur, the sub-blocks of eight bits can be declared right one after another and participate in the complete correction of the profile (imprint).

The process makes it possible to recommence the correction stage as many times as necessary, the limit being a time limit corresponding to the duration of the biometric measurement.

Obviously, numerous modifications and variations of the present invention are possible in light of the above teachings. It is therefore to be understood that within the scope of the appended claims, the invention may be practiced otherwise than as specifically described herein.

What is desired to be secured by Letters Patents of the United States is:

1. A process for identifying and authenticating an individual by verifying data characterizing said individual, using a verifying biometer and a chip card, said process comprising the steps of:
   recording on said card a first set of data wherein said first set of data includes identification and biometric characteristics of an owner of said card and is stored in the form of a sequential string of binary words obtained by a recording biometer;
   acquiring a second set of data in said verifying biometer wherein said second set of data characterizes said individual who is the card holder;
   processing said first set and said second set of data, said processing including steps of:
   organizing in a virtual manner sequential groups of words into p matrix sub-blocks of P bits;
   organizing in a virtual manner the matrix sub-blocks into a single matrix block of M rows and N columns;
   performing permutations of said sub-blocks in matrix block M×N;
   performing permutations of the words inside said matrix sub-blocks;
   determining a word for each row of matrix block M×N;
   exchanging words resulting in the card and in the processing biometer;
   comparing said exchange words;
   processing in said processing biometer the set of words as a result of comparisons to reduce differences resulting from said step of comparing;
   providing a decision in said card of the identification and authentication as a function of the result of said processing.

2. The process according to claim 1, wherein the steps of performing the permutations of the sub-blocks further includes the steps of:
   generating in the card a first series of random numbers and transmitting it to the biometer;
   generating in the biometer a second series of random numbers and transmitting it to the card;
   constituting a first table containing the X1 address of each sub-block in the matrix block and the corresponding X2 address provided by the first series of random numbers;
   constituting a second table containing the X2 addresses obtained after the first permutation and the X3 addresses provided by the second series of random numbers.

3. The process according to claim 1, wherein the step of comparing the words further includes the steps of:
   calculating the distance between the words obtained by the card and those obtained by the biometer;
   interrupting the verification in the case where the distance is approximately equal to a given distance;
   performing corrections sub-block by sub-block, in the case where the distance obtained is different from the distance given;
   performing a third permutation of the sub-blocks and of the words in the sub-blocks;
   determining a word for each row of the matrix block;
   exchanging the words thus obtained in the card and in the biometer;
   comparing the words with the final stage in the card;
   declaring that there is or is not correlation as a function of the results of the comparison.

4. The process according to claim 3, wherein the step of performing corrections includes the step of assigning a word to each row of words of the sub-blocks intended to indicate whether the bits forming each word are probably right or probably wrong or definitely right.

* * * * *